United States Patent [19]

Herion et al.

[11] Patent Number: 4,821,773
[45] Date of Patent: Apr. 18, 1989

[54] DIRECTIONAL CONTROL VALVE

[75] Inventors: Erich Herion, Stuttgart; Helmut Motzer, Leinfelden-Echterdingen, both of Fed. Rep. of Germany

[73] Assignee: Herion-Werke KG, Fellbach, Fed. Rep. of Germany

[21] Appl. No.: 164,562

[22] Filed: Mar. 7, 1988

[30] Foreign Application Priority Data

Mar. 13, 1987 [DE] Fed. Rep. of Germany ....... 3708248

[51] Int. Cl.$^4$ .......................................... F15B 13/044
[52] U.S. Cl. ............................. 137/625.65; 251/129.1
[58] Field of Search ................. 137/625.65; 251/129.1

[56] References Cited

U.S. PATENT DOCUMENTS 4,406,307  9/1983  Loup et al. ............... 137/625.65
4,456,434  6/1984  El Ibiary ................... 137/625.65 X

FOREIGN PATENT DOCUMENTS 2725917  9/1978  Fed. Rep. of Germany ....................... 137/625.65

*Primary Examiner*—Gerald A. Michalsky
*Attorney, Agent, or Firm*—Henry M. Feiereisen

[57] ABSTRACT

A directional control valve for liquid and gaseous fluids includes a valve piston and magnets controlling the valve piston and arranged at a distance at the end faces of the valve piston to define respective chambers therebetween. Flow forces prevailing during operation of the control valve and opposing the actuation force of the magnets are countered by providing a throttle in the connections to the tank to create a dynamic pressure to support the magnetic force. In order to limit the magnitude of the hydraulic force as provided by the dynamic pressure, the chambers in front of the end faces of the valve piston are connected to each other via two passageways in which a pressure relief valve is respectively arranged.

10 Claims, 1 Drawing Sheet

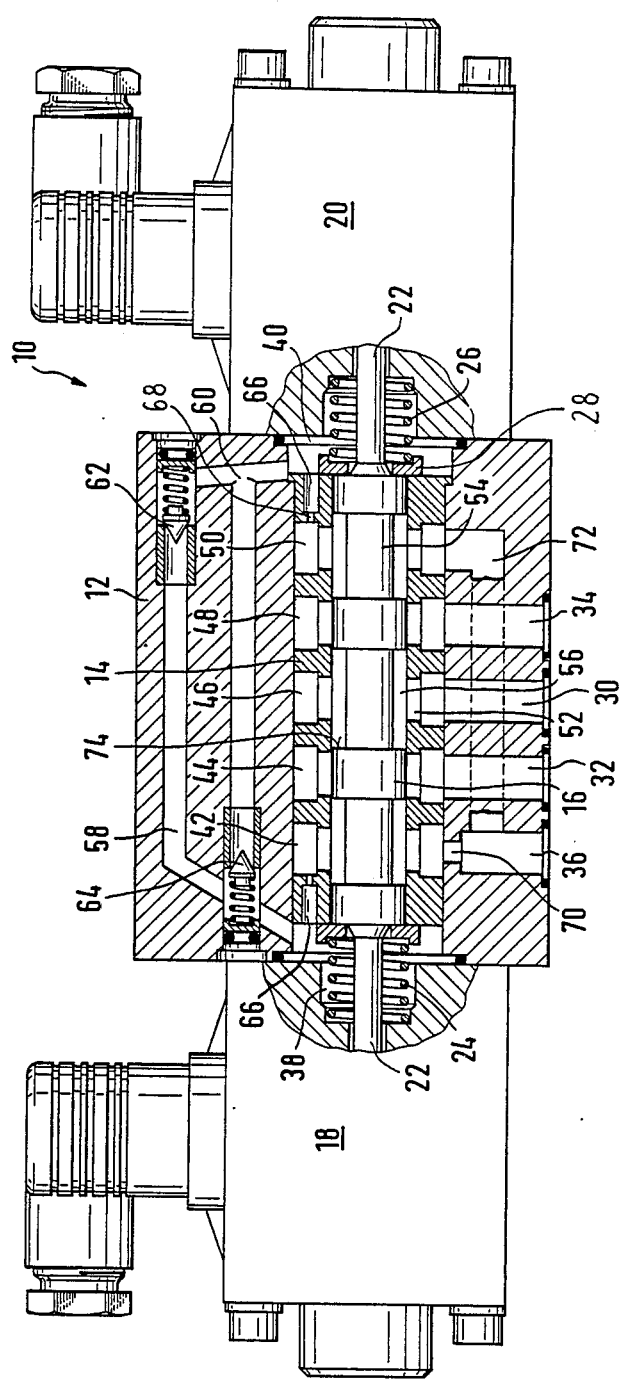

DIRECTIONAL CONTROL VALVE

BACKGROUND OF THE INVENTION

The present invention is concerned with a control valve, and in particular with a directly controlled proportional directional control valve for liquid or gaseous fluids.

Known directional control valves include a housing in which a valve bush is accommodated which guides a valve piston for axial displacement. The displacement of the valve piston is controlled by magnets so as to selectively link various flow connections between a pressure or inlet port, e.g. two working ports and a tank. Each working port is connected to the tank via a throttle to produce a dynamic pressure acting upon each end face of the valve piston in direction of displacement and thus supporting the force of the respectively actuated magnet.

The valve piston in such a directional control valve, is subjected to axial flow forces which oppose the force of the magnets, the magnitude of which is dependent on the rate of flow and the pressure drop at the valve.

The hydraulic output of such a directional control valve i.e. the maximal rate of flow at the respective pressure drop is limited by the maximal admissible actuation force of the magnets. Since these flow forces increase very rapidly with increasing rate of flow, they reach the magnitude of the magnetic force already at relatively small rates of flow so that the valve piston cannot be actuated any further thereby limiting the opening range of the valve.

It was proposed to provide a throttle between each of the working ports and the tank in order to generate a dynamic pressure which supports the force of the respectively actuated magnet. Such a dynamic pressure can, however, increase very rapidly so that the hydraulic force supporting the magnetic force exceeds the flow force and possibly an additional spring force. This, however, would urge the valve piston against the flow force and spring force against an end stop preventing any control or return of the valve piston into a neutral center position.

SUMMARY OF THE INVENTION

It is thus an object of the present invention to provide an improved control valve of the afore-stated type obviating the afore-stated drawbacks.

This object and others which will become apparent hereinafter are attained in accordance with the invention by providing two passageways between a chamber in front of one end face of the valve piston and a chamber in front of the other end face of the valve.

Suitably, a pressure relief valve is arranged in each of said passageways for limiting the hydraulic force which is generated by the dynamic pressure and acts upon the end faces of the valve piston, thereby preventing the hydraulic force to exceed a desired value and thus keeping the valve piston from running against an end stop.

The throttles which are provided between the working ports and the tank are each preferably connected with each space (spring space) between the respective magnet and valve piston via an annular channel defined between the housing and the valve bush and via an axial bore in the valve bush. Preferably, a further throttle is provided in the axial bore.

According to a further feature of the invention, the throttles between the working ports and the tank are provided through flow resistance in the connections to the tank or through a constriction in these connections.

BRIEF DESCRIPTION OF THE DRAWING

The above and other objects, features and advantages of the present invention will now be described in more detail with reference to the accompanying drawing in which:

The sole FIGURE shows a cross sectional view of one embodiment of a directional control valve in accordance with the invention.

DETAILED DESCRIPTION OF PREFERRED EMBODIMENTS

Referring now to the drawing, there is illustrated a cross sectional view of a directional control valve, in particular a directly controlled proportional directional control valve generally designated by reference numeral 10 and suitable for regulating the flow of fluids such as liquid fluids as e.g. oil or gaseous fluids.

The directional control valve 10 has a housing 12 with an axial central bore in which a valve bush 14 is stationarily contained by suitable means as e.g. by being pressed in. Guided for axial displacement in the valve bush 14 is a valve piston 16 which is actuated and controllable by magnets 18, 20 arranged at each axial end of the valve piston 16. Each of the magnets 18, 20 cooperates with a tappet 22 which is in engagement with the facing axial end face of the piston 16 so that the latter is axially movable in either direction through respective excitation of the magnets 18, 20.

The magnets 18, 20 are arranged at a distance to the opposing end faces of the valve piston 16 so as to define with the housing 12 respective spring chambers 38, 40 at the axial ends of the valve piston 16. In the embodiment as shown in the FIGURE, both spring chambers 38, 40 extend partly into the magnets 18, 20 and partly into the housing 12. Accommodated in each spring chamber 38, 40 is a pressure spring 24, 26 which retains the valve piston 16 in closing position via suitable spring plates 28 as shown in the FIGURE.

The housing 12 is further provided with an inlet port 30, two working ports 32, 34 and a tank 36. Arranged between the housing 12 and the valve bush 14 are annular channels 42, 44, 46, 48, 50 whereby the inlet port 30 communicates with the annular channel 46, the working ports 32, 34 with the annular channels 44, 48 and the tank 36 with the annular channel 42. In addition, the annular channel 50 is connected to the tank 36 via a bore 72.

In the nonlimiting example as shown in the FIGURE, the valve piston 16 is provided with three axial annular grooves 56 which extend between the inner wall of the valve bush 14 and the rod 54 of the valve piston 16 whereby each annular channel 42, 44, 46, 48, 50 is in communication with one of the annular grooves 56 via a respective transverse bore 52.

Interposed between the annular space 42 and the tank 36 is a throttle 70. A further throttle is arranged between the annular space 50 and the tank 36 and is defined in the nonlimiting example of the illustrated embodiment by the bore 72 i.e. the flow resistance generated by the bore 72 is used as throttle to provide a dynamic pressure. It will be readily recognized that a different type of throttle may be provided between the annular space 50 and the tank 36 such as e.g. a throttle like the throttle 70 i.e. through a constriction in the connection. Further, it is also conceivable to provide a throttle between the annular space 42 and the tank 36 for generating a dynamic pressure through the flow resistance in a suitable connection from the annular space 42 to the tank 36. This may be achieved by axially arranging the tank 36 centrally between the annular spaces 42 and 50 so that the respective lengths of the connections from the annular spaces 42, 50 to the tank 36 correspond to each other and thus the same throttle action is accomplished.

In the illustrated embodiment, the length and the diameter of the bore 72 is such that the same pressure drop and thus the same throttle action is obtained as through the throttle 70.

As is further illustrated in the FIGURE, the housing 12 accommodates a passageway or bore 58 which connects the spring chamber 38 with the spring chamber 40 and accommodates at a suitable location a pressure relief valve 62. A further passageway or bore 60 connects the spring chamber 40 with the spring chamber 38, and a pressure relief valve 64 is provided in this passageway 60. As will be described further below, by means of the pressure relief valves 60, 62, the flow of the fluid between the spring chambers 38, 40 is controlled as soon as the fluid pressure in the spring chambers 38, 40 exceeds a certain preset value.

The spring chamber 38 is further connected with the annular channel 42 via a bore 66 extending in the valve bush 14 while the spring chamber 40 is in communication with the annular channel 50 via a further such bore 66 in the valve bush 14. Each of the bores 66 may be provided with a throttle 68 in order to restrict the flow of fluid from the respective annular channels 42, 50 into the spring chambers 38, 40.

After having described in detail the various elements of a directional control valve in accordance with the present invention, its mode of operation will now be explained.

When e.g. exciting the magnet 18, the corresponding tappet 22 shifts the valve piston 16 to the right hand side in the FIGURE thereby compressing the spring 26 located in spring chamber 40. Thus, the magnet 18 has to overcome the force exerted by the spring 26. Depending on the excitation of the magnet 18, the valve piston 16 is displaced to a certain degree to the right and thus opens the connection between the annular channel 46 to the annular channel 48 via the respective transverse bores 52 and the respective annular groove 56 thereby connecting the inlet port 30 with the working port 34. Simultaneously, the annular channel 44 is in communication with the annular channel 42 thereby linking the working port 32 with the tank 36. Pressure fluid such as compressed oil can now flow from the inlet port 30 to the working port 34 while being discharged from the working port 32 to the tank 36.

During the opening of the connection between the annular channel 46 and the annular channel 48, axial flow forces occur in the respective annular groove 56 which act upon the control cross section or shoulder 74 of the valve piston 16 and oppose the force of the magnet 18. Thus, the magnet 18 has to overcome in addition to the force of the spring 26 also this flow force which means that as soon as the sum of the spring force and the flow force corresponds to the maximal admissible actuation force of the magnet, the latter is prevented from further moving the tappet 22 and thus the valve cannot open any further.

As has been previously mentioned, the displacement of the valve piston 16 to the right opens the connection between the annular channel 44 and the annular channel 42 so that the fluid can flow from the working port 32 to the tank 36. The throttle 70 in the connection between the annular channel 42 and the tank 36 will now cause in the annular channel 42 a dynamic pressure which also prevails in the spring chamber 38 by means of the bore 66 via which the annular channel 42 communicates with the spring chamber 38. Consequently, the end face of the valve piston 16 at the left hand side in the FIGURE is subjected to this dynamic pressure in direction of actuation of the magnet 18 so that a hydraulic force is created which supports the force as exerted by the magnet 18. By providing such a hydraulic force, the magnet 18 is able to overcome to a greater degree the opposing forces exerted by the spring 26 and the flow acting upon the shoulder 74 which means that the valve piston 16 and thus the valve can be displaced or opened further than would be possible without such a hydraulic force. Therefore, the rate of flow can be increased.

The other spring chamber 40 is connected with the annular channel 50 via the bore 66 and thus via the bore 72 with the tank 36. In this position of the valve, fluid cannot be discharged via the bore 72 so that no dynamic pressure prevails in the spring chamber 40. The pressure in the spring chamber 40 corresponds to the pressure in the tank 36 so that the pressure drop from the spring chamber 38 to the spring chamber 40 is the same as the pressure drop from the annular channel 42 to the tank 36.

In the opposite case in which the magnet 20 is excited, the tappet 22 will displace the valve piston 16 in the other direction i.e. to the left hand side in the FIGURE thereby connecting the inlet port 30 with the working port 32 while the working port 34 communicates with the tank 36 via the annular channel 50 and the bore 72. Evidently the valve is controlled in similar manner as previously described except that in this case the dynamic pressure is created in the spring chamber 40 and acts upon the right hand end face of the valve piston 16. Thus, a hydraulic force is provided which supports the magnetic force of the magnet 20 in direction of actuation. A Throttling between the annular channel 50 and the tank 36 is accomplished in the illustrated embodiment by the flow resistance of the bore 72. It is, however, certainly conceivable to provide instead thereof a throttle such as the throttle 70.

In order to prevent the hydraulic force from exceeding the flow force and the spring force, the pressure in the spring chamber 38 is limited by the pressure relief valve 62 and the pressure in the spring chamber 40 by the pressure relief valve 62. Thus, when the pressure in the spring chamber 38 exceeds a preset value during excitation of the magnet 18 and displacement of the valve piston 16 to the right, the pressure relief valve 62 will open to allow the fluid to flow from the spring chamber 38 via passageway 58 into the spring chamber 40. Thence, the pressure buildup in the spring chamber 38 is kept within desired values.

Likewise, if the dynamic pressure in the other spring chamber 40 exceeds the preset value during excitation of the magnet 20 and displacement of the valve piston 16 to the left, the pressure relief valve 64 will open to allow a flow of fluid from the spring chamber 40 via passageway 60 into the spring chamber 38 so as to limit the pressure build up in the spring chamber 40. Therefore, it is guaranteed that a respective magnetic force is constantly required to actuate the valve piston 16.

While the invention has been illustrated and described as embodied in a Directional Control Valve, it is not intended to be limited to the details shown since various modifications and structural changes may be made without departing in any way from the spirit of my present invention.

What is claimed as new and desired to be protected by Letters Patent is set forth in the appended claims,

We claim:

1. A directional control valve for liquid and gaseous fluid, comprising:
    a housing having fluid inlet means, fluid outlet means and tank means;
    valve means accommodated in said housing for selectively regulating the fluid flow, said valve means including a reciprocating valve piston and magnetic means acting upon said valve piston at each end face thereof;
    throttle means for creating a dynamic pressure within a chamber in front of said end faces to act upon the latter in direction of actuation of said magnetic means;
    fluid-carrying passageway means within said housing for connecting said chamber at said one end face of said valve piston with said chamber at said other end face of said valve piston; and
    pressure relief valve means provided in said passageways means for limiting the pressure in said chambers.

2. A directional control valve as defined in claim 1 wherein said fluid carrying passageway means includes at least two passageways for connecting said chambers at said end faces of said valve piston with each other.

3. A directional control valve as defined in claim 1 wherein said magnetic means includes two magnets arranged at opposing axial ends of said valve piston at a distance to the latter to define said chambers at said end faces of said valve piston.

4. A directional control valve as defined in claim 1 wherein said throttle means includes a throttle, said fluid-carrying passageway means including an annular channel and an axial bore to connect said throttle with said chamber.

5. A directional control valve as defined in claim 4 wherein said valve means further includes a valve bush, said annular channel being provided between said housing and said valve bush and said axial bore being arranged in said valve bush.

6. A directional control valve as defined in claim 4 wherein said throttle means includes a further throttle disposed in said axial bore.

7. A directional control valve as defined in claim 1 wherein said throttle means is defined by the flow resistance in said fluid carrying passageway means to said tank means.

8. A directional control valve as defined in claim 1 wherein said throttle means is defined by a constriction in said fluid carrying passageway means to said tank means.

9. A directional control valve for liquid and gaseous fluids, comprising:
    a housing having a fluid inlet, two working ports and a tank;
    valve means accommodated in said housing for selectively regulating the fluid flow, said valve means including a reciprocating valve piston and magnetic means acting upon said valve piston at each end face thereof for actuating the latter;
    throttle means located between said working ports and said tank for creating a dynamic pressure within a chamber in front of said end faces to act upon the latter in direction of actuation of said magnets;
    fluid-carrying passageway means including two passageways for connecting said chamber at said one end face of said valve piston with said chamber at said other end face; and
    pressure relief valve means provided in said passageways means for limiting the pressure in said chambers.

10. A directional control valve as defined in claim 9 wherein said valve means further includes a valve bush, said throttle means including a throttle between each of said working ports and said tank, and said fluid carrying passageway means further including an annular channel between said housing and said valve bush and an axial bore in said valve bush, each of said throttles being connected to the respective one of said chambers via such an annular channel and such an axial bore.

* * * * *